United States Patent
Kulik et al.

(10) Patent No.: US 11,558,406 B1
(45) Date of Patent: Jan. 17, 2023

(54) METHOD AND APPARATUS FOR USING A KERNEL MODULE TO PROVIDE COMPUTER SECURITY

(71) Applicant: UAB 360 IT, Vilnius (LT)

(72) Inventors: Ernestas Kulik, Vilnius (LT); Mohamed Adly Amer Elgaafary, Vilnius (LT); Aleksandr Ševčenko, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/674,998

(22) Filed: Feb. 18, 2022

(51) Int. Cl.
*H04L 29/06* (2006.01)
*H04L 9/40* (2022.01)

(52) U.S. Cl.
CPC ...... *H04L 63/1416* (2013.01); *H04L 63/0435* (2013.01); *H04L 63/145* (2013.01); *H04L 63/1425* (2013.01); *H04L 63/20* (2013.01)

(58) Field of Classification Search
CPC ............. H04L 63/1416; H04L 63/0435; H04L 63/1425; H04L 63/145; H04L 63/20
See application file for complete search history.

(56) References Cited

U.S. PATENT DOCUMENTS

| | | | |
|---|---|---|---|
| 5,715,456 A * | 2/1998 | Bennett | G06F 9/4406 713/2 |
| 9,154,479 B1 * | 10/2015 | Sethi | H04L 63/20 |
| 10,277,562 B1 * | 4/2019 | Frederick | H04L 9/006 |
| 10,805,320 B1 * | 10/2020 | Wang | H04L 63/0245 |
| 11,310,246 B2 * | 4/2022 | Rehak | H04L 63/20 |
| 2007/0169190 A1 * | 7/2007 | Kolton | G06F 21/552 726/25 |
| 2019/0253398 A1 * | 8/2019 | Sun | G06F 21/6263 |
| 2022/0067484 A1 * | 3/2022 | Karin | H04L 43/08 |

* cited by examiner

*Primary Examiner* — Joseph P Hirl
*Assistant Examiner* — Ka Shan Choy
(74) *Attorney, Agent, or Firm* — Moser Taboada

(57) ABSTRACT

Systems and methods for using a kernel module to provide computer security are provided herein. In some embodiments, a method for providing computer security may include launching a kernel module at the kernel-level of a computing device, redirecting, using the kernel module, communications traffic away from a browser executing on the computing device, decoding, using the kernel module, the received traffic to create decoded traffic, analyzing the decoded traffic, using the kernel module, for content having particular characteristics and create analyzed traffic, encoding, using the kernel module, at least a portion of the analyzed traffic to create encrypted traffic, and directing the encrypted traffic to the browser.

20 Claims, 3 Drawing Sheets

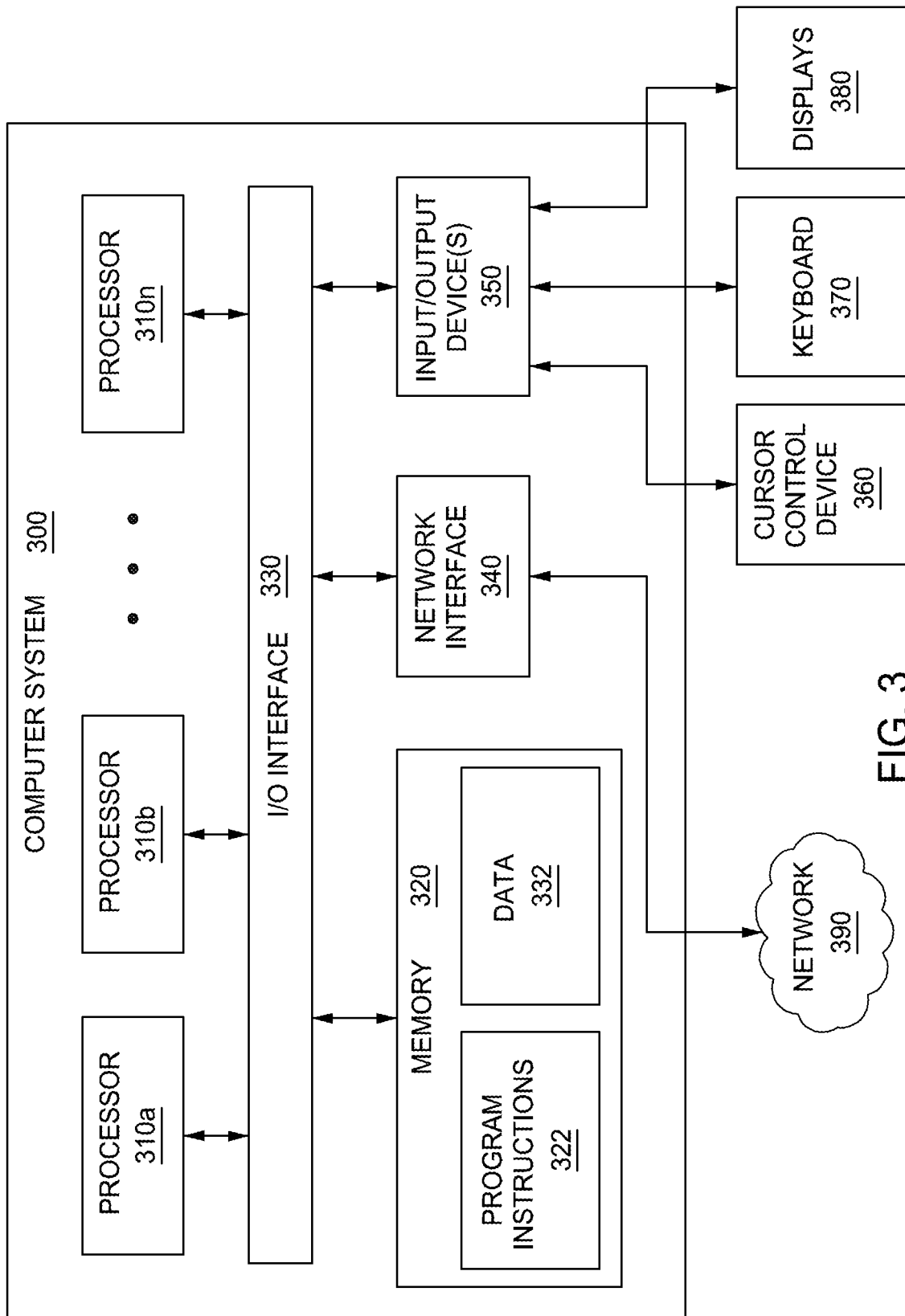

METHOD AND APPARATUS FOR USING A KERNEL MODULE TO PROVIDE COMPUTER SECURITY

FIELD

The present invention relates generally to Internet security protocols, and more particularly to a system and method for using a kernel module to provide computer security.

BACKGROUND

Transport Layer Security (TLS) and Secure Sockets Layer (SSL) are cryptographic protocols designed to provide communications security over a computer network. The protocol is widely used in applications such as email, instant messaging, and voice over IP, but its use in securing HTTPS remains the most publicly visible. User connects to the internet and is sending and receiving traffic (including HTTPS).

Data traffic flow on the Internet is secured using security certificates (i.e., SSL certificates). Security certificates are supplied to web servers from trusted certificate authorities such that a client application, (e.g., a web browser), executing on a user device may securely access the web server and securely receive data from the web server. Using certificates, the server's data (e.g., web page content) is transmitted using TSL to send encrypted data to the user device. Unfortunately, the data from a web server may carry a virus or malware which, when received by the user device, may infect the device. Because the data is encrypted until the user device application (e.g., browser) receives the data, any malware or virus detection application executing on the user device has no ability to inspect the encrypted data. Consequently, the encrypted data may carry viruses and malware into the user device.

Therefore, there is a need for improved methods and apparatuses for providing computer security.

SUMMARY

A method and apparatus for using a kernel module to provide computer security. The kernel module redirects communications traffic received by a computing device (e.g., a user device) away from a browser executing on the computing device and decodes the traffic. The decoded traffic is analyzed for particular characteristics, e.g., malicious content. Traffic carrying such content is blocked or otherwise handled by the driver to ensure the security of the computing device is not impacted. After analysis, the data is encoded and coupled to the browser such that the computing device's browser may display or otherwise use the data traffic. Operation of the kernel module is transparent to the computing device.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 3 depicts a high-level block diagram of a computing device suitable for use with embodiments of a system for using a kernel module in accordance with at least one embodiment of the invention.

Figure 1:
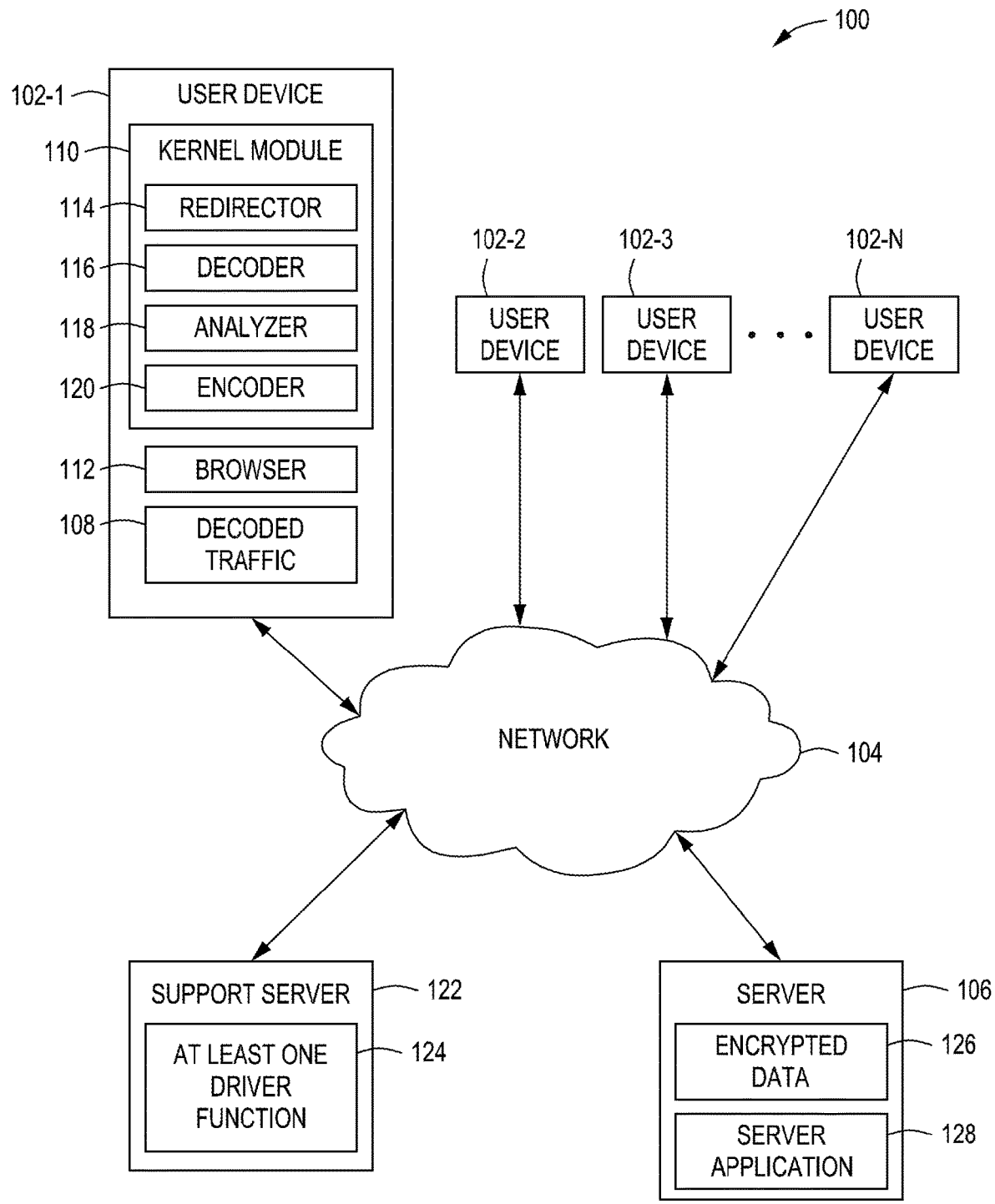
FIG. 1 illustrates an example of a computer system for using a kernel module in accordance with at least one embodiment of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, apparatuses and systems) for using a kernel module to provide computer security. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present invention use a kernel module to provide computer security for a user device (e.g., a computing device). In some embodiments, upon installation of a client application (e.g., an anti-malware application), a kernel-level driver (i.e., kernel module) is installed and the kernel module is launched (executed) when the client application is executed. In other embodiments, the kernel module is launched upon startup of the user device or startup of a browser executing on the computing device. The kernel module redirects all communication traffic received by the user device to an analyzer which analyzes the traffic to detect malicious content, e.g., viruses, malware, etc. Specifically, the driver decodes the traffic, analyzes the traffic, and encodes the traffic before sending the traffic to the browser of the user device. The operation of the driver is transparent to the user device. The decoded traffic is processed by a user space service to identify any malicious content within the traffic. If malicious content is found, the user space service responds to mitigate the threat to the user device. The remaining content is encoded and directed to the user device computing components for processing as normal, e.g., processed by a browser for display or other use. In at least one embodiment, the driver functions are performed within the kernel module executing on the user device. In other embodiments, one or more of the driver functions may be performed remotely such that the driver directs the communications traffic to a server that performs the decoding, analysis, and encoding functions. As such, the functions of the driver may be locally performed or remotely performed in a distributed manner.

Thus, methods and apparatuses consistent with embodiments of this present invention use a kernel module to provide computer security. Details of such methods and apparatuses are described in detail below with respect to the figures.

FIG. 1 illustrates an example of a computer network system 100 within which user devices (i.e., computing devices) use a kernel module to provide computer security. In FIG. 1, the system 100 comprises at least one user device 102, a server 106 and a computer network 104, (e.g., the Internet) connecting the server 106 to the user devices 102. The server 106 is a centralized computing device used to execute application(s) (server application 128) and communicate encrypted data 126 (i.e., content) to/from user devices 102. In an alternative embodiment, the system 100 further comprises a support server 122 that supports the kernel module 110 such that the driver may remotely use one or more driver functions 124 performed on the support server 122 as described below. The general structure of such servers and/or user devices is described in detail below with respect to FIG. 3.

User devices 102-1, 102-2, 102-3 . . . 102-N (collectively referred to as user devices 102) communicate through network 104 with the server 106. In some embodiments, user device 102 may be any computing device capable of executing a kernel-level driver 110 and browser 112. The driver 110 may be stored in memory of the user device 102 or may be stored on a "dongle" that is removably coupled to a communication port, e.g., USB port, of the user device 102. User device 102 may comprise any computing device that is connected to a network, including, for example, a laptop, a mobile phone, a tablet computer, a desktop computer, a smart device, a router, and other network devices. Each user device 102 comprises a browser 112 and a kernel module 110. In one embodiment, the driver 110 may perform its functions locally, or the driver may perform one or more functions remotely on the support server 122. The browser 112 is a well-known application for accessing and displaying web page content. Such browsers include, but are not limited to, Safari®, Chrome®, Explorer®, Firefox®, etc.

The kernel module 110 comprises a redirector 114, a decoder 116, an analyzer 118 providing a user space service, and an encoder 120. The kernel module 110 resides at the kernel level of the user device and has access to the data traffic arriving from the network 104. The function of the kernel module 110 is described in detail with respect to FIG. 2 below.

Figure 2:
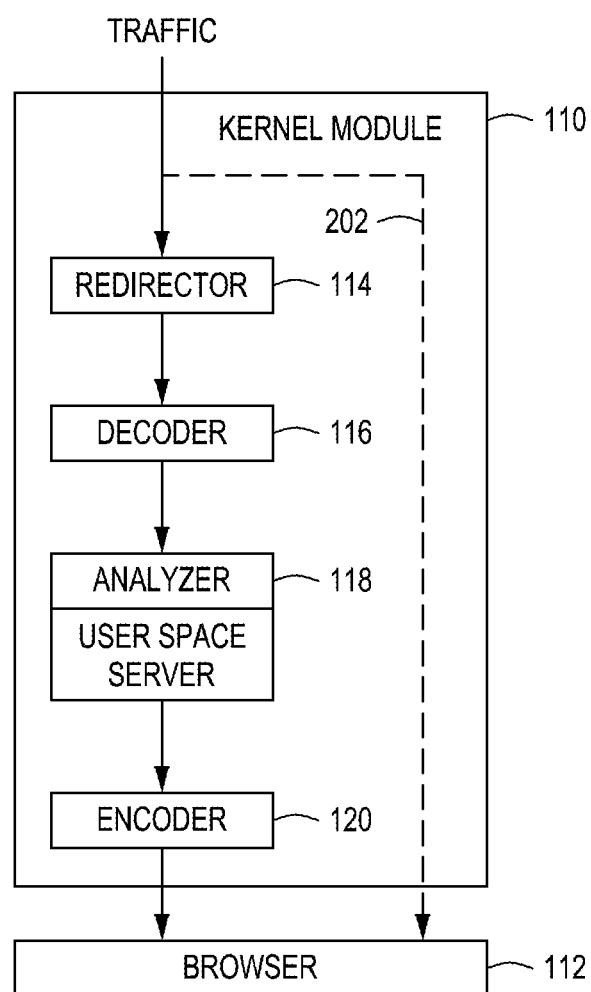
FIG. 2 depicts a functional block diagram of the kernel module in accordance with at least one embodiment of the invention.

FIG. 2 illustrates an exemplary functional block diagram representing one or more of the processes as described herein. Each block of the diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is a functional block diagram 200 of the kernel module 110 in accordance with at least one embodiment of the invention. In operation, the driver 110 uses the redirector 114 to redirect the traffic away from the browser 112 to the decoder 116. The "normal" path of the traffic is indicated by dashed arrow 202. The decoder 116 decrypts the traffic to form decoded traffic 108. The analyzer 118 provides a user space service to analyze the decoded traffic 108 to identify content with particular characteristics such as malicious content, e.g., viruses, malware, etc. If such content with the particular characteristics is found, the service 118 may remove the content or otherwise handle the malicious content to mitigate any harm the content may cause to the user device. Additionally, in some embodiments, a warning may be displayed to the user on the user device 102, the URL associated with the malicious content may be blocked from future access, drop the connection to the URL supplying the malicious content, and the like. The remaining content is encrypted by the encoder 120 and redirected back to the browser 112. The function of the kernel module 110 is transparent to the user device 102.

In an alternative embodiment, one or more driver functions 124 are remotely performed on the support server 122. In such an embodiment, the driver 110 redirects the traffic to the support server 122 where at least one of the decoding, encoding, and/or user space service are performed. In one embodiment, the kernel module 110 redirects the traffic to the server 122 and the server 122 decodes the traffic, analyzes the traffic to provide the user space services, and encodes the analyzed traffic. The traffic is then directed back to the user device.

FIG. 3 depicts a computer system 300 that can be utilized in various embodiments of the present invention to implement the computer and/or the display, according to one or more embodiments.

Various embodiments of method and system for using a kernel module to provide computer security, as described herein, may be executed on one or more computer systems, which may interact with various other devices. One such computer system is computer system 300 illustrated by FIG. 3, which may in various embodiments implement any of the elements or functionality illustrated in FIGS. 1 and 2. In various embodiments, computer system 300 may be configured to implement methods and functions described above. The computer system 300 may be used to implement any other system, device, element, functionality or method of the above-described embodiments. In the illustrated embodiments, computer system 300 may be configured to implement the user devices 102 and servers 106 and/or 122 and implement the driver functions as processor-executable executable program instructions 322 (e.g., program instructions executable by processor(s) 310) in various embodiments.

In the illustrated embodiment, computer system 300 includes one or more processors 310a-310n coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the functions illustrated by the diagram of FIG. 2. The functional blocks of FIG. 2 may be implemented in the user device or may be implemented partially in the user device and partially in the server 122. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Example Clauses

A. A method for providing computer security comprising:
launching a kernel module at the kernel-level of a computing device;
redirecting, using the kernel module, communications traffic away from a browser executing on the computing device;
decoding, using the kernel module, the received traffic to create decoded traffic;
analyzing the decoded traffic, using the kernel module, for content having particular characteristics and creating analyzed traffic;
encoding, using the kernel module, at least a portion of the analyzed traffic to create encrypted traffic;
directing the encrypted traffic to the browser.

B. The method of clause A, wherein at least one of the kernel module functions of decoding, analyzing, or encoding is remotely performed from the computing device by a server.

C. The method of clauses A or B, wherein content with the particular characteristic is deleted from the analyzed traffic.

D. The method of Clauses A-C, wherein the particular characteristic comprises at least one characteristic of malicious content.

E. The method of clauses A-D, wherein the malicious content is deleted from the analyzed traffic.

F. The method of clauses A-E, wherein the kernel module is stored on a dongle coupled to the computing device through a communications port.

G. The method of clauses A-F, wherein analyzing further comprises handling the particular traffic to mitigate harm to the computing device.

H. Apparatus for using a kernel module to provide computer security to a computing device comprising at least one processor coupled to at least one non-transitory computer readable medium having instructions stored thereon, which, when executed by the at least one processor, cause the at least one processor to perform operations comprising:
launching a kernel module to operate at the kernel-level of a computing device;
redirecting, using the kernel module, communications traffic away from a browser executing on the computing device;
decoding, using the kernel module, the received traffic to create decrypted traffic;
analyzing the decrypted traffic, using the kernel module, for content having particular characteristics;

encoding, using the kernel module, at least a portion of the analyzed traffic to create encrypted traffic;
directing the encrypted traffic to the browser.

I. The apparatus of clause H, wherein at least one of the kernel module functions of decoding, analyzing or encoding is remotely performed from the computing device by a server.

J. The apparatus of clauses H or I, wherein the particular content is deleted from the analyzed traffic.

K. The apparatus of clauses H-J, wherein the particular content comprises malicious content.

L. The apparatus of clauses H-K, wherein the malicious content is deleted from the analyzed traffic.

M. The apparatus of clauses H-L, further comprises a removable dongle for storing the kernel module is stored on a dongle coupled to the computing device through a communications port.

N. The apparatus of clauses H-M, wherein analyzing further comprises handling the particular traffic to mitigate harm to the computing device.

O. A kernel module operating at the kernel-level of a computing device comprising:
a redirector for redirecting communications traffic away from a browser executing on the computing device;
a decoder for decrypting the received traffic to create decrypted traffic;
an analyzer for analyzing the decrypted traffic for content having particular characteristics;
an encoder for encrypting at least a portion of the analyzed traffic to create encrypted traffic; and
the redirector directing the encrypted traffic to the browser.

P. The kernel module of clause O, wherein at least one kernel module function of decoding, analyzing or encoding is remotely performed from the computing device by a server.

Q. The kernel module of clause O or P, wherein the particular content is deleted from the analyzed traffic.

R. The apparatus of clauses O-Q, wherein the particular content comprises malicious content.

S. The apparatus of clauses O-R, wherein the malicious content is deleted from the analyzed traffic.

T. The apparatus of clauses O-S, further comprises a removable dongle for storing the kernel module and for removably coupling to the computing device through a communications port.

What is claimed is:

1. A method for providing computer security comprising:
launching a kernel module at a kernel-level of a computing device;
redirecting, using the kernel module, communications traffic away from a browser executing on the computing device;
decoding, using the kernel module, the received traffic to create decoded traffic;
analyzing the decoded traffic, using the kernel module, for content having particular characteristics and creating analyzed traffic;
encoding, using the kernel module, at least a portion of the analyzed traffic to create encrypted traffic; and
directing the encrypted traffic to the browser.

2. The method of claim 1, wherein at least one of the kernel module functions of decoding, analyzing, or encoding is remotely performed from the computing device by a server.

3. The method of claim 1, wherein content with the particular characteristic is deleted from the analyzed traffic.

4. The method of claim 1, wherein the particular characteristic comprises at least one characteristic of malicious content.

5. The method of claim 4, wherein the malicious content is deleted from the analyzed traffic.

6. The method of claim 1, wherein the kernel module is stored on a dongle coupled to the computing device through a communications port.

7. The method of claim 1, wherein analyzing further comprises handling the content having the particular characteristics to mitigate harm to the computing device.

8. A non-transitory computer readable medium having instructions stored thereon, which, when executed by at least one processor of a computing device, cause the at least one processor to perform operations comprising:
launching a kernel module to operate at a kernel-level of a computing device;
redirecting, using the kernel module, communications traffic away from a browser executing on the computing device;
decoding, using the kernel module, the received traffic to create decrypted traffic;
analyzing the decrypted traffic, using the kernel module, for content having particular characteristics;
encoding, using the kernel module, at least a portion of the analyzed traffic to create encrypted traffic;
directing the encrypted traffic to the browser.

9. The non-transitory computer readable medium of claim 8, wherein at least one of the kernel module functions of decoding, analyzing, or encoding is remotely performed from the computing device by a server.

10. The non-transitory computer readable medium of claim 8, wherein the content having particular characteristics is deleted from the analyzed traffic.

11. The non-transitory computer readable medium of claim 8, wherein the content having the particular characteristics comprises malicious content.

12. The non-transitory computer readable medium of claim 11, wherein the malicious content is deleted from the analyzed traffic.

13. The non-transitory computer readable medium of claim 8, wherein the kernel module is stored on a dongle coupled to the computing device through a communications port.

14. The non-transitory computer readable medium of claim 8, wherein analyzing further comprises handling the content having the particular characteristics to mitigate harm to the computing device.

15. A computing device for providing computer security comprising:
a processor; and
a memory coupled to the processor, the memory having stored therein a kernel module operating at a kernel-level of the computing device and executable by the processor to configure the computing device to:
redirect communications traffic away from a browser executing on the computing device;
decrypt received traffic to create decrypted traffic;
analyze the decrypted traffic for content having particular characteristics;
encrypt least a portion of the analyzed traffic to create encrypted traffic; and
direct the encrypted traffic to the browser.

16. The computing device of claim 15,
wherein at least one kernel module function of decoding, analyzing or encoding is remotely performed from the computing device by a server.

17. The computing device of claim 16, wherein the content having particular characteristics is deleted from the analyzed traffic.

18. The computing device of claim 16, wherein the content having particular characteristics comprises malicious content.

19. The computing device of claim 18, wherein the malicious content is deleted from the analyzed traffic.

20. The computing device of claim 16, further comprising a removable dongle coupled to the computing device through a communications port for storing the kernel module.

\* \* \* \* \*